United States Patent
Lim

(10) Patent No.: US 7,985,498 B2
(45) Date of Patent: Jul. 26, 2011

(54) LITHIUM SECONDARY BATTERY

(75) Inventor: Wanmook Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 691 days.

(21) Appl. No.: 12/034,047

(22) Filed: Feb. 20, 2008

(65) Prior Publication Data

US 2008/0299450 A1    Dec. 4, 2008

(30) Foreign Application Priority Data

May 30, 2007    (KR) .................... 10-2007-0052616

(51) Int. Cl.
| | |
|---|---|
| H01M 2/14 | (2006.01) |
| H01M 2/18 | (2006.01) |
| H01M 2/16 | (2006.01) |
| H01M 4/02 | (2006.01) |
| H01M 4/13 | (2006.01) |

(52) U.S. Cl. ........ 429/131; 429/129; 429/132; 429/133; 429/209; 429/247

(58) Field of Classification Search .................. 429/137, 429/138, 142, 146, 247, 251, 129, 131, 132, 429/133, 209

See application file for complete search history.

(56) References Cited

U.S. PATENT DOCUMENTS

| 5,543,247 A * | 8/1996 | Pulley et al. ................ 429/129 |
| 7,175,937 B2 * | 2/2007 | Cho et al. .................... 429/126 |
| 7,604,895 B2 * | 10/2009 | Kim et al. .................... 429/141 |

FOREIGN PATENT DOCUMENTS

| KR | 2006-43934 | 5/2006 |
| WO | WO 94/19837 | 9/1994 |

* cited by examiner

*Primary Examiner* — Patrick Ryan
*Assistant Examiner* — Julian Mercado
(74) *Attorney, Agent, or Firm* — Christie, Parker & Hale, LLP

(57) ABSTRACT

A lithium secondary battery that can improve safety of the battery. The lithium secondary battery comprises a jelly-roll type electrode assembly including first and second electrode plates having different polarities, and a separator interposed between the electrode plates. A porous ceramic film is coated on an active material of the first electrode plate, and the porous ceramic film is coated on one surface of an active material uncoated part of the first an outmost electrode plate and the porous ceramic film is not coated on another surface thereof.

19 Claims, 3 Drawing Sheets

LITHIUM SECONDARY BATTERY

CROSS-REFERENCE TO RELATED APPLICATION

This application is based on and claims priority to Korean Patent Application No. 10-2007-0052616, filed on May 30, 2007, in the Korean Intellectual Property Office (KIPO), the entire contents of which are hereby incorporated by reference.

BACKGROUND OF THE INVENTION

1. Field of the Invention

Aspects of the present invention relate to a lithium secondary battery, and more particularly, to a lithium secondary battery having improved safety characteristics.

2. Description of the Related Art

Generally, a secondary battery can be rechargeable, miniaturized, and have large capacity. Recently, secondary batteries have been used as main power supplies of portable electronic devices, such as a camcorder, a portable computer, and a cellular phone. Typically, nickel-hydrogen (Ni-MH) batteries, lithium ion (Li-ion) batteries, and lithium ion polymer batteries have been actively developed.

Lithium, which is commonly used as an active material of a secondary battery, has a low atomic weight, and thus, is suitable for manufacturing a battery having a large electrical capacity per unit mass. Further, lithium intensively reacts with water, and thus, a non-aqueous electrolyte is used in a lithium battery. Lithium batteries are not affected by an electrolysis voltage of water. Therefore, there is an advantage in that lithium batteries can generate an electromotive force of 3 to 4 volts.

The non-aqueous electrolytes used in the lithium ion secondary batteries include a liquid electrolyte and a solid electrolyte. The liquid electrolyte is formed by dissociating lithium salts in an organic solvent. Ethylene carbonate, propylene carbonate, carbonate containing alkyl groups, or similar organic compounds, are commonly used as the organic solvent.

The electrolytes have low ion conductivity. The low ion conductivity of the electrolytes can be supplemented, by increasing an area of an electrode active material, and a facing area between two electrodes. However, there are several limitations related to increasing the facing area between two electrodes. As a result, the low ion conductivity of the electrolyte increases an internal impedance of the battery, resulting in a large internal voltage drop, and limiting output, by restricting a current of the battery when a high current discharge is required.

A separator, interposed between two electrodes, restricts the movement of lithium ions. In the case where the separator does not have sufficient permeability and wettability, the separator restricts the movement of lithium ions between the two electrodes, thereby degrading electrical properties of the battery. Accordingly, important properties of the separator, which relate to the performance of the battery, include heat-resistance, chemical resistance, mechanical strength, void content, and wettability by an electrolyte. The void content is an area of vacant space at a random sectional surface.

The separator of the lithium ion battery also functions as a safety device, which prevents overheating of the battery. A polyolefin-type, micro-porous film, which is commonly used as material of the separator, is softened and partially melted when heated above a predetermined temperature. Accordingly, micro-holes of the micro-porous film, which are passages for lithium ions and a connecting passages for the electrolyte, become closed. As a result, the movement of the lithium ions is stopped, and a current flow of the interior/exterior of the battery is interrupted, and a temperature increase of the battery is stopped.

However, in the case where temperature of the battery is increased, the separator may be damaged, even if the micro-holes of the separator are closed. The separator is partially melted, and two electrodes of the battery directly contact each other at the melted point, thereby allowing producing an internal electrical short. The separator can also shrink, thereby allowing two electrodes to contact each other, and be electrically shorted.

When an over-current flows in the battery, due to a high capacity of the battery, a large amount of heat can be generated. The heat can damage the separator, which can increase the probability of an internal electrical short, to a level that is higher than in the case where the battery temperature causes the micro-holes of the separator to close, because the separator is continuously melted by over-current generated heat.

Accordingly, it is more important to solve the problems of melting or shrinking of the separator, at the time of overheating of the battery, rather than the current shutdown produced by closing the micro-holes of the separator.

To solve the heat-related problems, a ceramic film is used to prevent internal electrical shorts between electrodes, even at high temperatures. The ceramic film is usually manufactured by forming a film solution, which includes uniformly dispersed ceramic particles, a binder, and a solvent. The film solution can be applied by dipping an electrode plate, coated with an active material, in the film solution. The ceramic film is coated on surfaces where cathode and anode plates face each other, thereby preventing an electrical short between the electrode plates, while allowing lithium ions to pass there through.

In the secondary battery having the coated ceramic film (as an additional separator), it is possible to effectively prevent the internal electrical short, by coating the ceramic film on the electrode active material, as well as on an uncoated part of an electrode, where the electrode active material is not present.

However, there is a problem that the battery, including the electrode plate coated with the ceramic film, is not effectively electrically shorted by an external impact or stimulus, as determined using a nail penetration test, and thus, the safety of the battery is reduced.

SUMMARY OF THE INVENTION

Aspects of the present invention provide a lithium secondary battery having improved safety characteristics, and that includes a porous ceramic film coated on a first surface of an uncoated part of an electrode plate, which is located adjacent to an outer surface of an electrode assembly. A second surface of the uncoated part is not coated with the ceramic film, and can be used to generate an electrical short in an outer electrode layer of the electrode assembly, if the electrode assembly experiences an external impact.

According to an aspect of the present invention, there is provided a lithium secondary battery, which comprises: a jelly-roll type electrode assembly, including first and second electrode plates having different polarities, and a separator interposed between the electrode plates; and an electrolytic solution. A porous ceramic film is coated on an active material of the first electrode plate. The porous ceramic film is coated on a first surface of an active material uncoated part of the second electrode plate. The uncoated part is disposed adjacent to an outer surface of the electrode assembly, and the porous ceramic film is not coated on a second surface of the uncoated part.

According to aspects of the present invention, the porous ceramic film is not coated on one surface of an active material uncoated part of a first electrode, which faces an uncoated part of a second electrode.

According to aspects of the present invention, the separator may be a resin separator. The resin separator may be formed of a multi-layer film of polyethylene, polypropylene, or combination thereof, each of which has fine porous structure.

According to aspects of the present invention, a porous ceramic film may be coated on an inner surface of the active material uncoated part of an electrode plate, and not be coated on an outer surface in wound state.

According to aspects of the present invention, an electrode plate coated with the porous ceramic film may be an anode plate.

According to aspects of the present invention, the porous ceramic film may be formed by combining a binder with a ceramic material.

According to aspects of the present invention, the porous ceramic film may be formed by: dipping, spraying, or printing an electrode with a mixture of a ceramic material, a binder, and a solvent.

According to aspects of the present invention, the ceramic material may include at least one of silica ($SiO_2$), alumina ($Al_2O_3$), zirconium oxide ($ZrO_2$), and titanium oxide ($TiO_2$).

According to aspects of the present invention, the ceramic material may include at least one of an insulating nitride, hydrate, alkoxide, or ketonide, of silicon (Si), aluminum (Al), zirconium (Zr), titanium (Ti), or a combination thereof.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings of which.

DETAILED DESCRIPTION OF THE EMBODIMENTS

Figure 1:
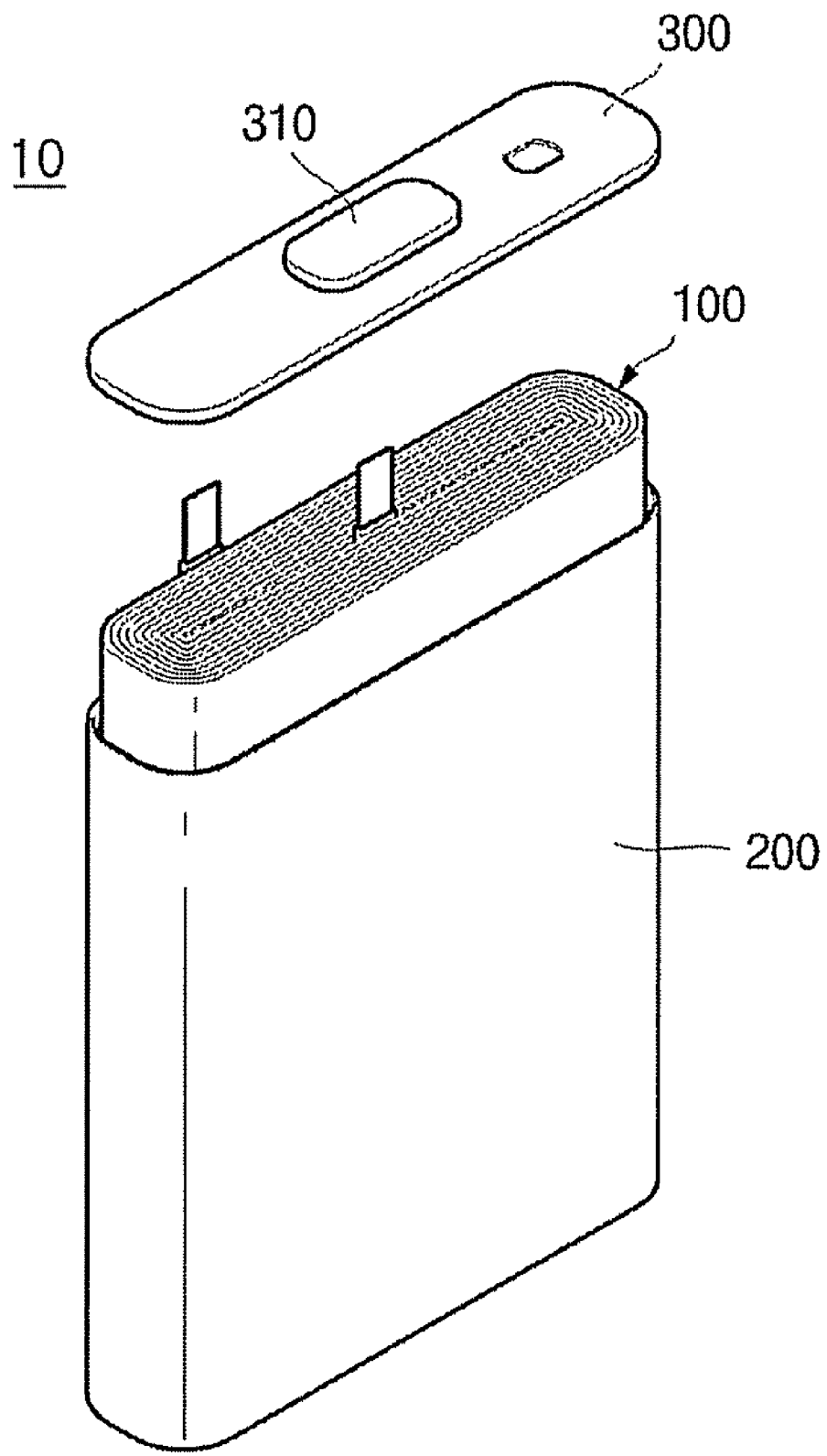
FIG. 1 is a perspective view illustrating a lithium secondary battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of present invention, by referring to the figures.

Figure 2:
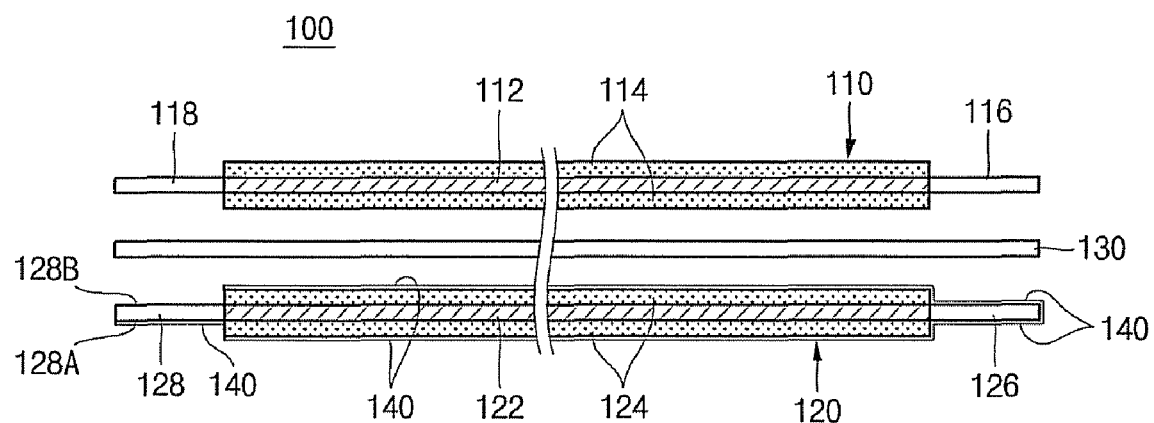
FIG. 2 is a construction view illustrating an electrode plate and a separator of an electrode assembly, of the lithium secondary battery according to the exemplary embodiment of the present invention.
Figure 3:
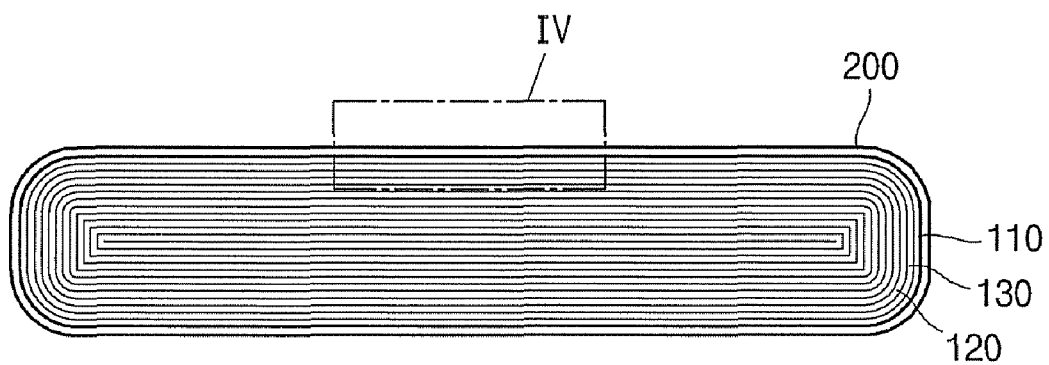
FIG. 3 is a schematic plan view illustrating the electrode assembly of the lithium secondary battery disposed in a can.
Figure 4:
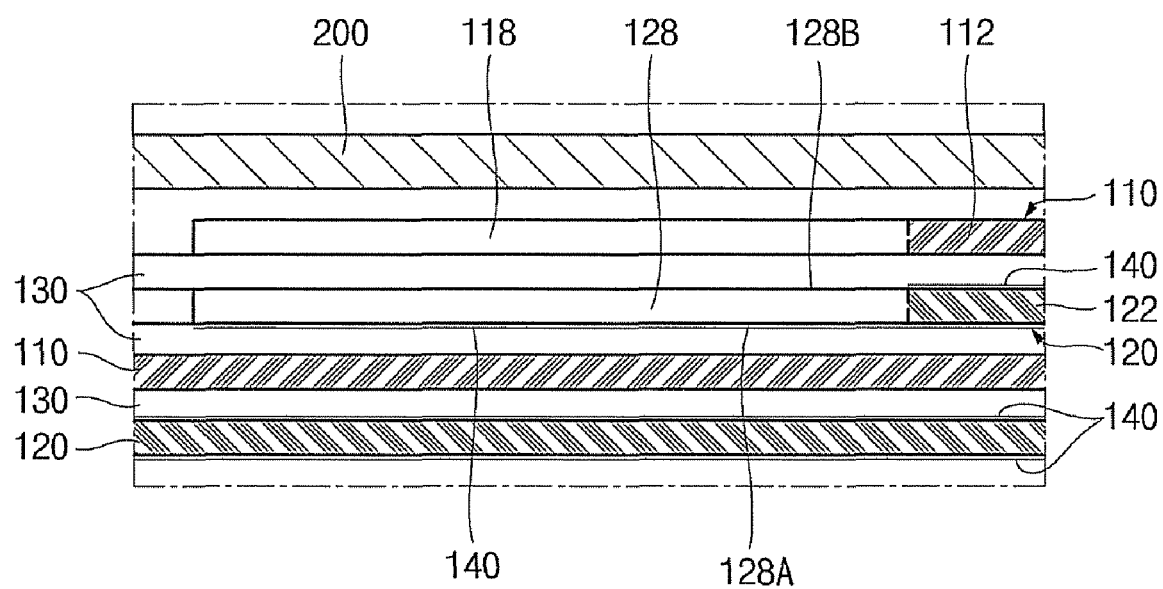
FIG. 4 is a magnified view illustrating section "IV" of FIG. 3.

FIG. 1 is a perspective view illustrating a lithium secondary battery, according to an exemplary embodiment of the present invention, and FIG. 2 is a construction view illustrating an electrode plate and a separator of an electrode assembly of the lithium secondary battery, and FIG. 3 is a schematic plan view illustrating the electrode assembly of the lithium secondary battery is received in a can, and FIG. 4 is a magnified view illustrating "IV" part of FIG. 3.

Referring to FIGS. 1 to 4, a lithium secondary battery 10 includes an electrode assembly 100, a can 200 to house the electrode assembly 100, and a cap assembly 300 to seal an upper end of the can 200. The cap assembly 300 includes an electrode terminal 310 to electrically couple the electrode assembly 100 to an external terminal.

The electrode assembly 100 includes: a cathode plate 110 provided with a cathode active material layer 114 formed on a predetermined region of a cathode collector 112, which is a base material; an anode plate 120 provided with an anode active material layer 124 formed on a predetermined region of an anode collector 122; and a resin separator 130 interposed between the cathode plate 110 and the anode plate 120. Cathode uncoated parts 116 and 118 are disposed at both ends of the cathode plate 110, where the cathode active material layer 112 is not formed. Anode uncoated parts 126 and 128 are regions at both ends of the anode plate 120, on which the anode active material layer 122 is not formed.

The cathode active material can be a lithium oxide, such as, $LiCoO_2$, $LiMn_2O_4$, $LiNiO_2$, and $LiMnO_2$. The anode active material can be a carbonic material, silica (Si), tin (Sn), tin oxide, composite tin alloys, and a transition metal oxide.

The cathode collector 112 of the cathode plate 110 may be made of aluminum (Al), for example. The anode collector 122 of the anode plate 120 may be made of copper (Cu), for example. The resin separator 130 is formed of a multi-layer film of polyethylene, polypropylene, or combination thereof, each of which has fine porous structure.

The lithium secondary battery 10 includes a porous ceramic film 140, formed by coating a ceramic material on the anode plate 120. The porous ceramic film 140 prevents an electrical short between the cathode plate 110 and the anode plate 120, and is permeable to lithium ions.

The porous ceramic film 140 is formed by dipping the anode plate 102 in a film solution. The film solution includes a ceramic material (particles) uniformly dispersed in a binder and a solvent. The porous ceramic film 140 is coated on at least one of the two electrode plates 110 and 120. The porous ceramic film 140 may be formed by spraying, dipping, or printing the film solution on the anode plate 120.

The ceramic material may include at least one of silica ($SiO_2$), alumina ($Al_2O_3$), zirconium oxide ($ZrO_2$), and titanium oxide ($TiO_2$). The ceramic material can include an insulating nitride, hydrate, alkoxide, or ketonide, of silicon (Si), aluminum (Al), zirconium (Zr), titanium (Ti), or a combination thereof, but is not limited thereto. For example, the ceramic material can be a titanium hydrate, an aluminum alkoxide, a silicon nitride, a zirconium ketonide, etc.

Referring to FIG. 2, the porous ceramic film 140 is coated on the active material layer 122 of the anode plate 120. The porous ceramic film 140 is coated on both surfaces of the anode uncoated part 126. The anode uncoated part 126 is arranged at a winding center of the electrode assembly 100. The porous ceramic film 140 is coated on an inner surface 128A of the anode uncoated part 128, and is not coated on an outer surface 128B of the anode uncoated part 128. The anode uncoated part 128 is disposed at an outer surface of the electrode assembly 100 (adjacent to the can 200).

Referring to FIGS. 3 and 4, the electrode assembly 100 includes the cathode and anode plates 110 and 120, which are wound together. The electrode assembly 100 is received in the can 200. The porous ceramic film 140 is not coated on the outer surface 128B, which faces the can 200, but is coated on the inner surface 128a, which faces the winding center of the electrode assembly 100.

As described above, when the porous ceramic film 140 is coated only on the inner surface 128A of the anode uncoated part 128. Only the resin separator 130 is interposed between the cathode uncoated part 118 of the cathode plate 110, and the anode uncoated part 128 of the anode plate 120. Accordingly, the cathode uncoated part 118, and the anode uncoated part 128, are not separated from each other by the porous ceramic film 140.

When an external impact occurs, as exemplified by a nail penetration test, an electrical short may occur between the cathode uncoated part 118 and the anode uncoated part 128. The safety characteristics of the battery 10 are improved, by a current-dispersing effect of the electrical short.

As described above, the ceramic film 140 is not coated on both surfaces of the anode uncoated part 128, which is disposed adjacent to the periphery of the electrode assembly 100. The ceramic film 140 is coated on the inner surface 128A of the anode uncoated part 128. Accordingly, an electrical short can occur between the outer surface 128B and the cathode uncoated part 118. Further, an electrical short is prevented from occurring between the inner surface 128A and the cathode plate 110.

In the exemplary embodiment, the porous ceramic film 140 is coated on one surface of the anode uncoated part 128, however, if the orientation of the electrode plates 110 and 120 is reversed in the electrode assembly 100, the cathode plate 110 may be coated instead of the anode plate 120. In other words, the polarity of the electrode plates 110 and 120 is not critical.

As described above, a lithium secondary battery, according to aspects of the present invention, produces the following effects. First, an internal electrical short can be prevented at internal portion of an electrode assembly, by a porous ceramic film coated on an electrode plate. Second, an electrical short can occur between an uncoated portion of an electrode plate and an adjacent uncoated portion of a second electrode plate, adjacent to an outer surface of the electrode assembly, due to an external impact applied to the battery, thereby allowing the safety of the battery to be assured.

Although an exemplary embodiment of the present invention has been shown and described, it would be appreciated by those skilled in the art that changes may be made in this exemplary embodiment, without departing from the principles and spirit of the invention, the scope of which is defined in the claims and their equivalents.

What is claimed is:

1. A lithium secondary battery comprising:
a first electrode plate having a first polarity, wherein the first electrode plate has a coated portion coated with an active material and an uncoated portion at a first end region and at a second end region not coated with the active material;
a second electrode plate having a second polarity that is different from the first polarity, wherein the second electrode plate has a coated portion coated with the active material and an uncoated portion at a first end region and at a second end region not coated with the active material;
a separator located between the first electrode plate and the second electrode plate;
an electrolytic solution to conduct electrons between the first electrode plate and the second electrode plate; and
a porous ceramic film coated on the active material of the first electrode plate, and a first surface of the uncoated portion at the first end region of the first electrode plate, wherein the first electrode plate, the second electrode plate, and the separator are wound into a jelly-roll type electrode assembly, such that a region of the ceramic film contacts the separator and the first electrode plate such that the uncoated portion at the first end region of the first and second electrode plates are located adjacent to an outer surface of the electrode assembly, and the first surface of the uncoated portion of the first end region of the first electrode plate faces a winding center of the electrode assembly.

2. The lithium secondary battery of claim 1, wherein a second surface of the uncoated portion at the first end region of the first electrode plate is not coated with the ceramic film and faces the outer surface of the electrode assembly and the uncoated portion at the first end region of the second electrode plate.

3. The lithium secondary battery of claim 1, wherein the separator is a resin separator.

4. The lithium secondary battery of claim 1, wherein the separator comprises layers of polyethylene, polypropylene, or a combination thereof, having a porous structure.

5. The lithium secondary battery of claim 1, wherein the first electrode plate is a cathode.

6. The lithium secondary battery of claim 1, further comprising a can to house the electrode assembly.

7. The lithium secondary battery of claim 1, wherein the first electrode plate is an anode.

8. The lithium secondary battery of claim 1, wherein the ceramic film comprises a binder and a ceramic material.

9. The lithium secondary battery of claim 1, wherein the ceramic film comprises a mixture of a ceramic material, a binder, and a solvent.

10. The lithium secondary battery of claim 1, wherein the ceramic film comprises silica ($SiO_2$), alumina ($Al_2O_3$), zirconium oxide ($ZrO_2$), titanium oxide ($TiO_2$), or a combination thereof.

11. The lithium secondary battery of claim 1, wherein the ceramic film comprises a nitride, a hydrate, an alkoxide, or a ketonide, of silicon (Si), aluminum (Al), zirconium (Zr), titanium (Ti), or a combination thereof.

12. A lithium secondary battery comprising:
a first electrode plate having a first polarity, wherein first electrode plate has a coated portion coated with an active material and an uncoated portion at a first end region and at a second end region not coated with the active material;
a second electrode plate having a second polarity that is different from the first polarity, wherein the second electrode plate has a coated portion coated with the active material and an uncoated portion at a first end region and at a second end region not coated with the active material;
a separator located between the first electrode plate and the second electrode plate; and
a porous ceramic film coated on the active material of the first electrode plate, and a first surface of the uncoated portion of the first end region of the first electrode plate, wherein the first electrode plate, the second electrode plate, and the separator are wound into a jelly-roll type electrode assembly, such that a region of the ceramic film contacts the separator and the first electrode plate such that the uncoated portions at the first end regions of the first and second electrode plates are located adjacent to an outer surface of the electrode assembly, and a second surface of the uncoated portion at the first end region of the first electrode plate is not coated with the ceramic film and faces the outer surface of the electrode assembly and the uncoated portion at the first end region of the second electrode plate.

13. The lithium secondary battery of claim 12, wherein the uncoated portions at the second end region of the first electrode plate and the second electrode plate are located adjacent to a winding center of the electrode assembly.

14. The lithium secondary battery of claim 13, where the uncoated portion at the second end region of the first electrode plate is coated with the ceramic film.

15. The lithium secondary battery of claim 12, wherein the separator is a resin separator.

16. The lithium secondary battery of claim 12, wherein the separator comprises layers of polyethylene, polypropylene, or a combination thereof, having a porous structure.

17. The lithium secondary battery of claim 12, wherein the ceramic film comprises silica ($SiO_2$), alumina ($Al_2O_3$), zirconium oxide ($ZrO_2$), titanium oxide ($TiO_2$), or a combination thereof.

18. The lithium secondary battery of claim 12, wherein the ceramic film comprises a nitride, a hydrate, an alkoxide, or a ketonide, of silicon (Si), aluminum (Al), zirconium (Zr) titanium (Ti), or a combination thereof.

19. The lithium secondary battery of claim 12, wherein the second surface of the uncoated portion at the first end region of the first electrode plate contacts the uncoated portion at the first end region of the second electrode plate and is configured to cause a short circuit if the outer surface of electrode assembly is punctured.

* * * * *

UNITED STATES PATENT AND TRADEMARK OFFICE
CERTIFICATE OF CORRECTION

| | |
|---|---|
| PATENT NO. | : 7,985,498 B2 |
| APPLICATION NO. | : 12/034047 |
| DATED | : July 26, 2011 |
| INVENTOR(S) | : Wanmook Lim |

It is certified that error appears in the above-identified patent and that said Letters Patent is hereby corrected as shown below:

On the Title Page

(57) Abstract, line 8.   Delete "an"
                         Insert -- and --

(57) Abstract, line 8.   Delete "plate"
                         Insert -- plate, --

Column 6, Claim 12, line 47.   After "wherein"
                               Insert -- the --

Signed and Sealed this
Second Day of October, 2012

David J. Kappos
*Director of the United States Patent and Trademark Office*